United States Patent
Crickmer

[15] 3,643,751
[45] Feb. 22, 1972

[54] HYDROSTATIC RISER PIPE TENSIONER

[72] Inventor: Charles D. Crickmer, Box 1348, Houston, Tex. 77001

[22] Filed: Dec. 15, 1969

[21] Appl. No.: 885,088

[52] U.S. Cl. .................................................. 175/7, 166/.5
[51] Int. Cl. ........................................................ E21b 17/02
[58] Field of Search ................................ 166/.5, .6; 175/7

[56] References Cited

UNITED STATES PATENTS

| | | |
|---|---|---|
| 3,211,224 | 10/1965 | Lacy .......................................... 166/.5 |
| 3,179,179 | 4/1965 | Kofahl ....................................... 166/.5 |
| 3,195,639 | 7/1965 | Pollard et al. ............................. 166/.5 |
| 3,313,345 | 4/1967 | Fischer ...................................... 166/.5 |

Primary Examiner—Marvin A. Champion
Assistant Examiner—Richard E. Favreau
Attorney—E. Wallace Breisch

[57] ABSTRACT

A hydrostatic riser pipe tensioner for use in underwater drilling operations and more specifically a means and method of insuring a resultant net tension force on an underwater riser pipe.

21 Claims, 5 Drawing Figures

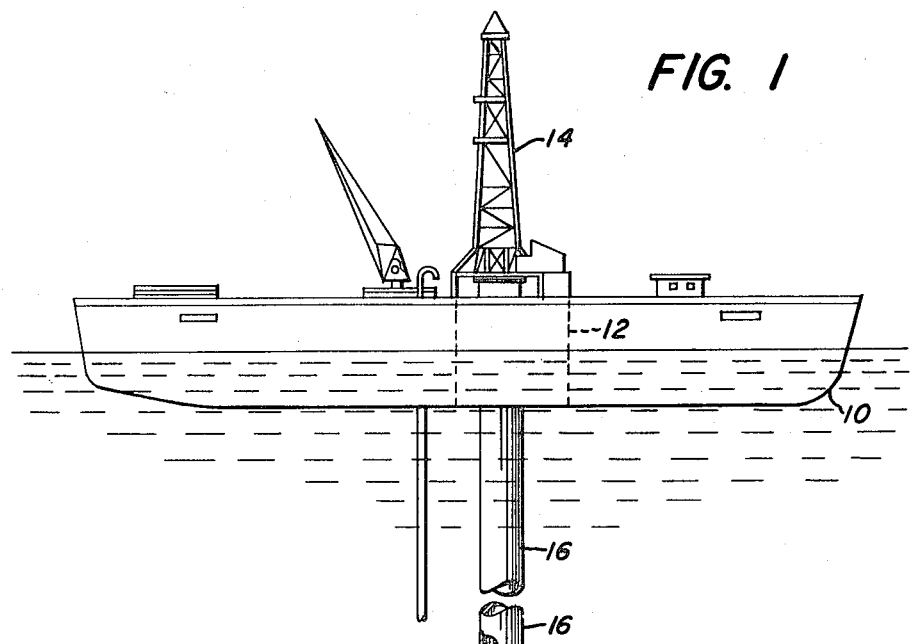
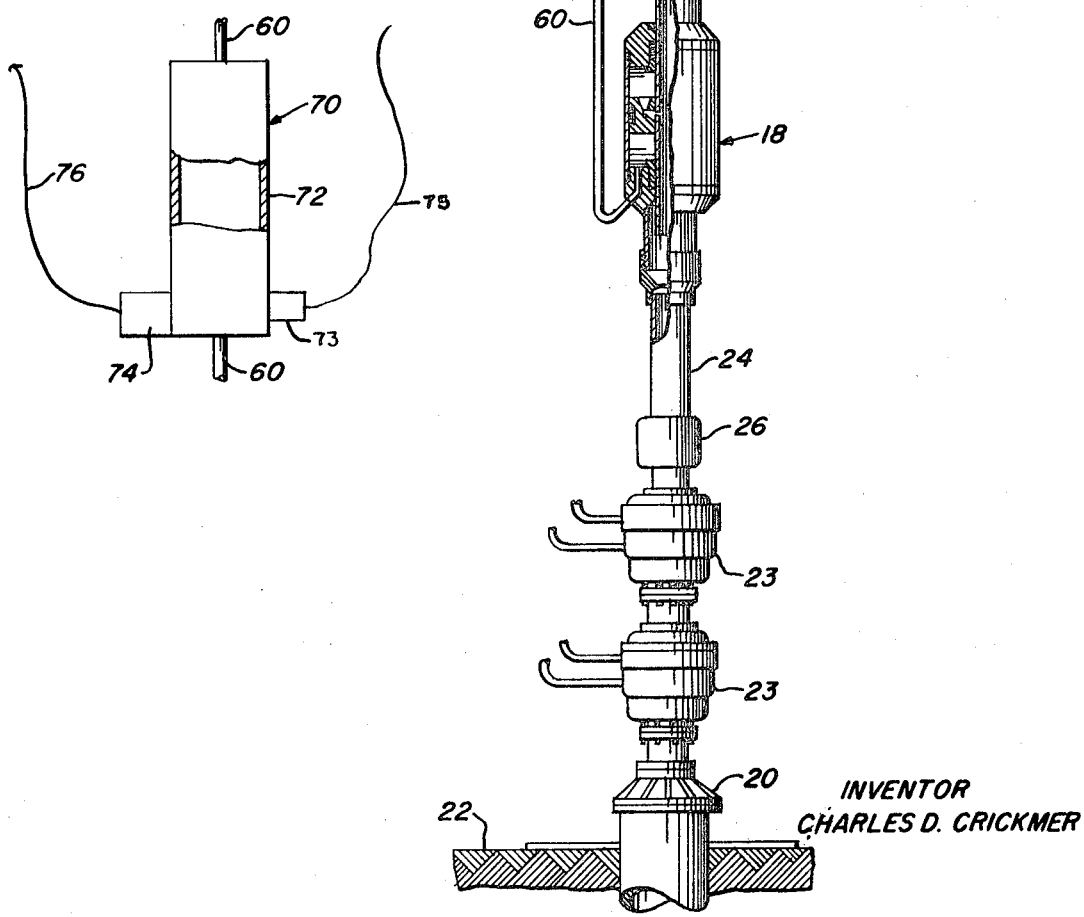
FIG. 1
FIG. 4
INVENTOR
CHARLES D. CRICKMER

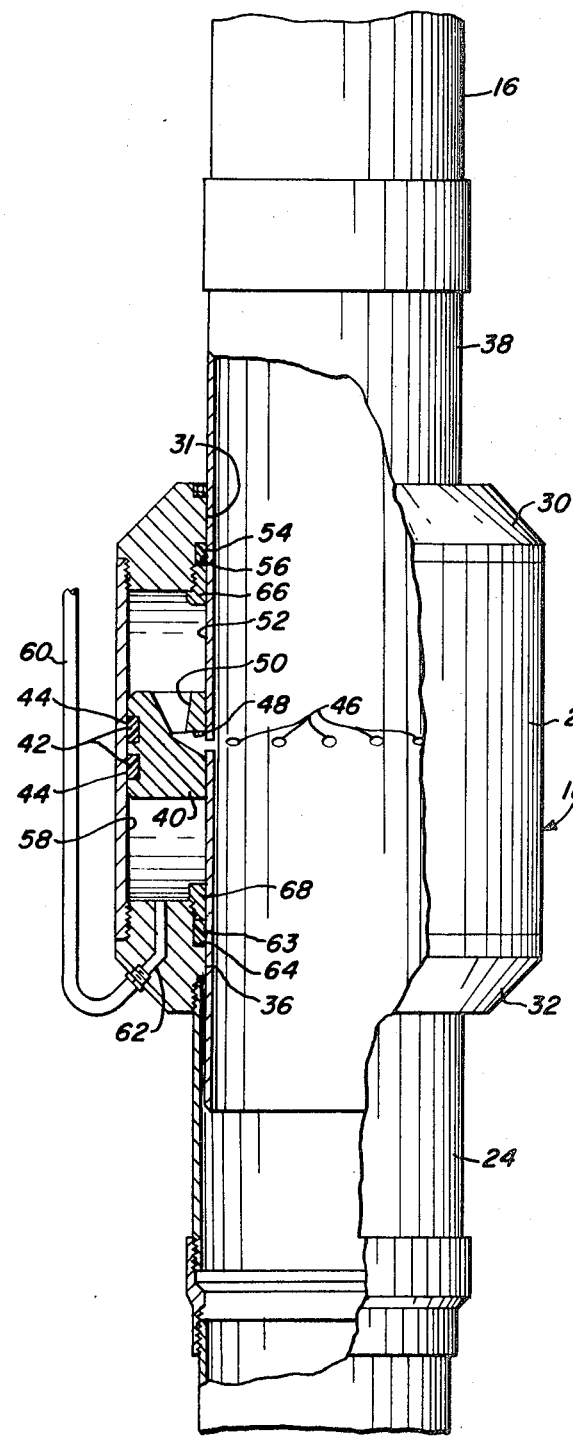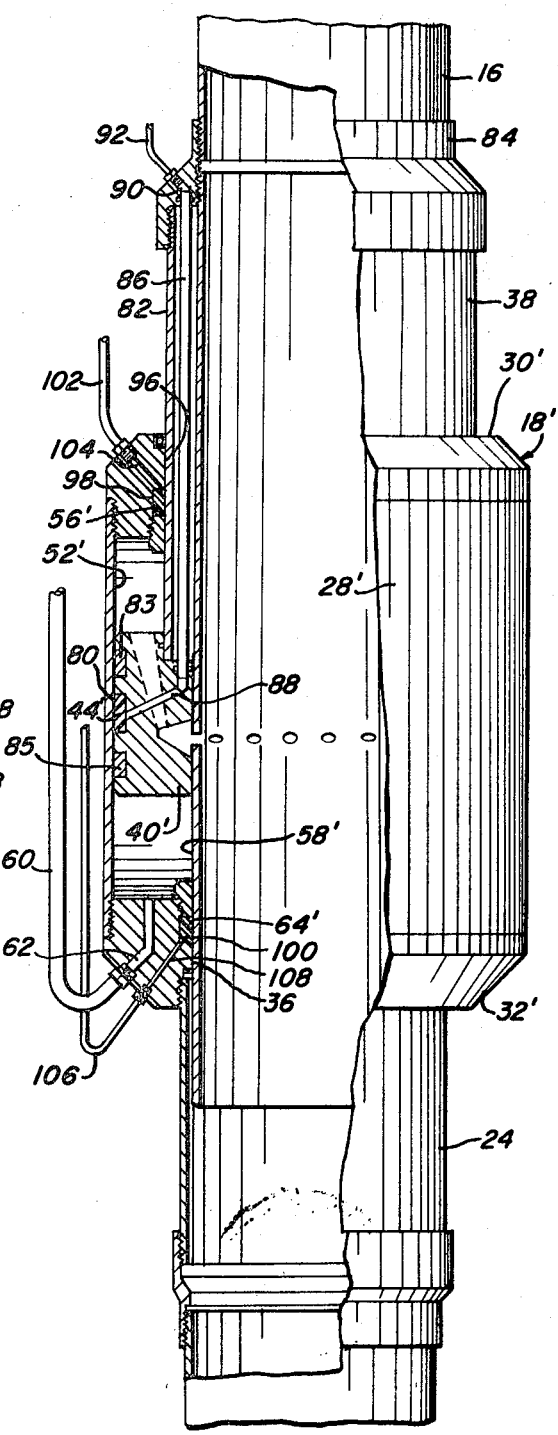
FIG. 2
FIG. 3
INVENTOR
CHARLES D. CRICKMER

INVENTOR
CHARLES D. CRICKMER

HYDROSTATIC RISER PIPE TENSIONER

Offshore drilling and other operations are often conducted from floating vessels or platforms. Such drilling is facilitated by the use of a riser pipe extending between the vessel and a wellhead on the ocean floor. Because of the relatively long length of the riser pipes in proportion to the radius of gyration thereof, the riser pipes have comparatively little resistance to any net compressive forces applied to the pipe and, therefore, it is essential to provide means which result in a net tensile force on the pipe whenever the drilling is being done in deep water.

Recognizing the above-mentioned problem, various means have been developed to insure the desired net tension result, for example, heave compensator and tension devices used at the vessel, or a piston arrangement adjacent the upper end of the riser whereby pressure fluid is supplied from an external source to maintain a constant upward force on the riser. These devices are operable in a somewhat efficient manner, however, the operation thereof is dependent on complicated equipment which must be constantly maintained and, because of the plurality of components, is subject to frequent and unexpected failure. Any failure in the tension maintaining devices can result in the riser pipe buckling under compressive loading. Additionally the devices mentioned hereinabove are relatively expensive in comparison with the structure of this invention.

An additional problem prevalent in drilling from a floating vessel is that means must be provided to compensate for the vertical movement of the vessel caused by wave heaves and the like. This problem has been solved by various techniques, one of such including a slip joint arrangement with packing means provided at the sliding surfaces thereof. As presently used, such packing means must be periodically replaced manually when they wear sufficiently to no longer be effective.

The structure of a hydrostatic riser pipe tensioner of the present invention comprises a relatively uncomplicated and self-contained unit secured to the wellhead assembly upwardly adjacent thereof and which slidably receives the lower portion of the riser pipe therein. A piston mechanism is secured to a portion of the riser pipe which reciprocates within the tensioner. A fluid head upwardly of the piston applies a downwardly directed force to the upper surface of the piston, thereby insuring the desired net tension force in the riser pipe. The simplicity of the invention alleviates the need for constant supervision and reduces the chances of unexpected failure as occur with prior art tensioning devices. A further feature of the present invention is a provision for supplying replenishable flowing packing means from the vessel directly to the packing areas, thereby relieving any necessity for manual replacement of the packing.

The objects and advantages of this invention will become more readily apparent from a reading of the following drawings and description in which:

FIG. 1 is a schematic elevational view of one form of apparatus for drilling into an underwater bottom from a fully floating vessel which includes the hydrostatic riser pipe tensioning means of the present invention;

FIG. 2 is a vertical section of one embodiment of a hydrostatic riser pipe tensioner of the present invention;

FIG. 3 is a vertical section of another embodiment of a hydrostatic riser pipe tensioner of the present invention; and FIG. 4 is a vertical section of a tension regulating means for use with a hydrostatic riser pipe tensioner of the present invention.

Figure 5:
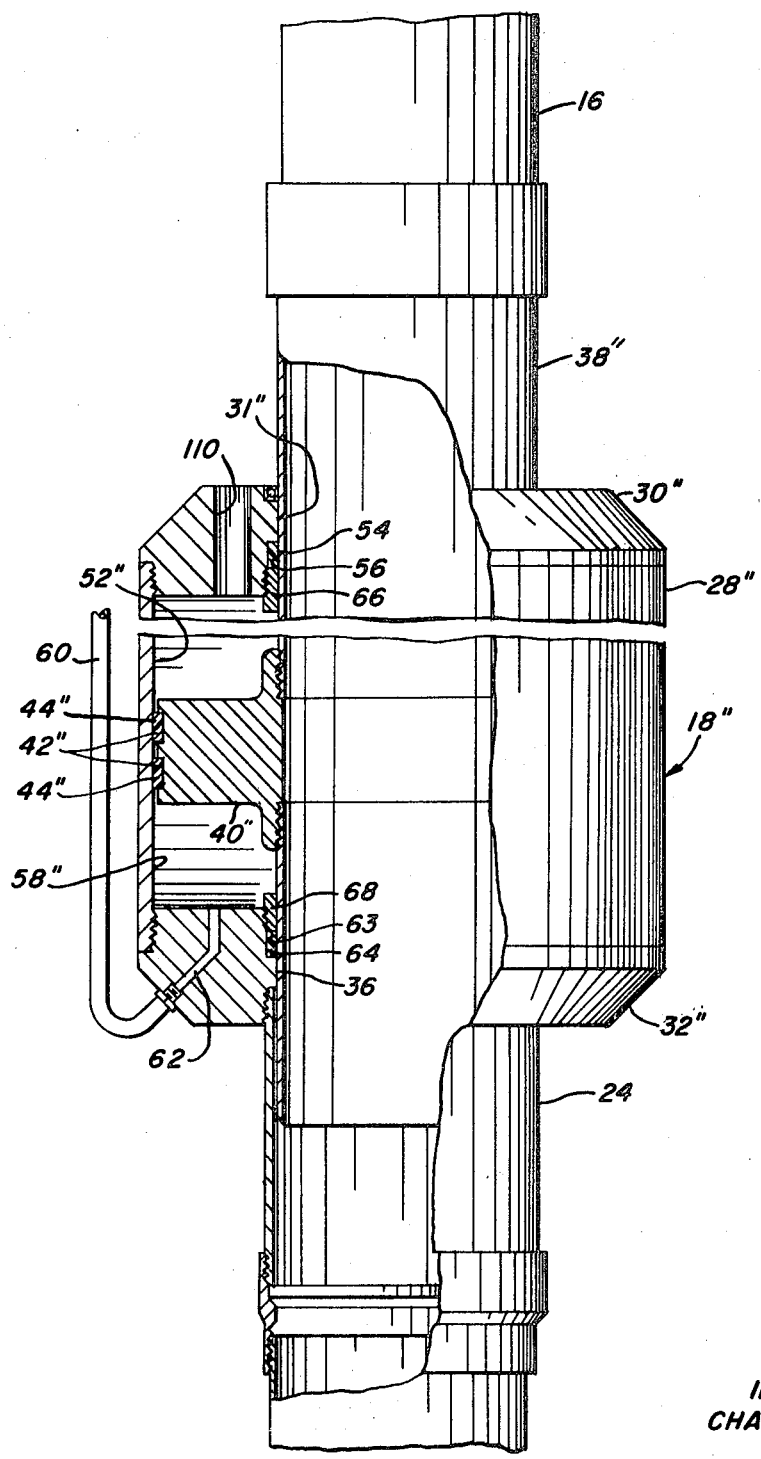
FIG. 5 is a vertical section of still another embodiment of a hydrostatic riser pipe tensioner of the present invention.

Referring to FIG. 1 an offshore drilling platform, such as a vessel 10 is anchored and floating on a body of water. The vessel 10 has a central well 12 therein above which is mounted a derrick 14 and the usual rotary drilling machinery. A riser pipe 16, through which drilling and other operations are conducted, is received in well 12 and attached to the vessel 10 in any suitable manner for example cables or a gimbal flange (not shown).

Riser pipe 16 extends downwardly from well 12 and has a lower end thereof slidably and captively received in a coaxial vertically elongated hydrostatic riser pipe tensioner 18 of this invention. A wellhead 20 is located on a submerged formation 22 in which the hole is being drilled. The wellhead 20 includes a plurality of well-known stacked blowout preventers 23. A tubular connecting member 24 extends from the uppermost blowout preventer 23 to the lower end of tensioner 18 and is releasably secured at the ends thereof to respective ends of such members. As shown member 24 has a well known flex joint 26 intermediate the axial ends thereof for allowance of limited transverse angular motion of riser pipe 16 and tensioner 18 with respect to stationary wellhead 20. A desirability for such limited angular transverse movement arises because of transverse currents and wind forces displacing vessel 10 from a stationary position.

With such an arrangement as hereinabove described a slip joint relationship exists between riser 16, at the lower end thereof, and tensioner 18, thereby permitting adjustments to be made to the effective length of riser 16 (i.e., that length above the upper end of tensioner 18) to compensate for vertical displacement of vessel 10 resulting from wave heave, and tides. Accordingly, the axial length of tensioner 18 or the stroke limit thereof is proportioned to allow the vessel to heave and compensate for tides within predetermined limits, for example 40 feet.

Inasmuch as the invention herein resides in the structure and method of operation of tensioner 18 and the balance of the elements mentioned hereinabove are well known in the art, further description of such elements is not believed to be warranted except where necessary to reflect the structure of tensioner 18.

In use, a riser pipe 16 is subjected to a variety of forces, such as; self-weight, underwater current, impact, resultant compressive forces caused by the returning drilling fluid circulating upwardly therethrough, frictional forces developing at the pipe slip joint, frictional forces developing at the inner surface of the pipe due to the movement of drilling mud thereagainst, wind forces applied to the vessel 10 which are transferred to the riser 16, sea water pressure and the like. All of the above forces can be calculated with some degree of accuracy, however, the application thereof to a riser pipe and the analysis of the riser pipe with such forces applied thereto has been the subject of a wide divergence of opinion by those skilled in the art. Accordingly, any theories advanced herein are simply by way of illustration of one approach to the analysis of net forces and as such it is to be realized that the invention resides in the structure and method of operation of the hydrostatic riser pipe tensioner 18 and not in the means of analyzing net forces applied thereto.

An approach to determine the net forces on the riser pipe 16 is to assume pipe 16 is a column which is pinned and supported at the top and closed and restrained but not supported at the bottom. These assumptions can be justified by viewing the securing of the riser 16 to vessel 10 as fixing the upper end thereof with respect to vertical movement but still allowing limited translation thereof and additionally viewing the slip joint relationship between riser 16 and tensioner 18 as restraining transverse movement of riser 16 at the lower end thereof but not providing any means of support. Justification for assuming that riser 16 is closed at the lower end thereof is found by relying upon the continuity of drilling fluid therein.

Analyzing riser 16 with respect to major constant forces, such as; self weight, which produces a net tensile force in the pipe; and the weight of the drilling fluid contained within the riser 16, which produces a net compressive force in the riser 16 when it is considered that the head of drilling fluid above any particular section of the riser 16 causes a force to record outwardly from the interior thereof, net results generally show a relatively large net compressive force acting on the riser pipe 16.

Risers presently in use often extend in excess of 300 feet and commonly have a diameter thereof of 20 inches. Assuming a 300-foot long by 20-inch diameter riser having a radius of gyration thereof of approximately 7 inches, it becomes readily apparent that the riser pipes ability to withstand a net compressive stress, as measured by a function of the slenderness ratio (K $l/r$) thereof, is nonexistent. Accordingly, in view of the general analysis discussed hereinabove, the hydrostatic riser pipe tensioner 18 is provided to insure that the net resultant stress on the riser pipe 16 is tensile rather than compressive. As is well known, the length of riser pipe 16 is of no consequence on the ability thereof to withstand a net tensile stress.

Hydrostatic riser pipe tensioner 18 (FIG. 2) comprises: an intermediate tubular body portion 28 having a diameter thereof larger than the diameter of riser 16; and upper and lower cylindrical end portions 30 and 32 respectively, which have an outer diameter thereof shown as approximately equal to the diameter of portion 28 and which are releasably secured to portion 28 at the respective upper and lower ends thereof. Portions 30 and 32 have central through bores 31 and 36 respectively therein which, as shown, are of a diameter equal to the diameter of riser 16 to allow riser 16 to be slidably and sealably received in tensioner 18. The lower end of portion 32 is releasably secured to connecting member 24, thereby fixedly securing tensioner 18 with respect to any vertical movement in relation to wellhead 20. Member 24 has an inner diameter thereof slightly larger than the outer diameter of riser 16.

Portion 38 has an annular pistonhead 40 sealingly secured to the outer periphery thereof intermediate the portion thereof which reciprocates within the tensioner 18. The outer diameter of piston 40 is substantially equal to the inner diameter of portion 28 and a sliding and sealing relationship is provided between such members by means of packing seals 42 which are positioned in circumferential grooves 44 of pistonhead 40.

Riser portion 38 has a plurality of portals 46 around the circumference thereof so positioned that they communicate with radially outwardly extending passageways 48 of pistonhead 40. Passageways 48 extend outwardly and open end in passageways 50 of head 40, which passageways 50 extend upwardly therefrom and open end in an upper tensioner chamber 52. Chamber 52 is defined by the annular space upward of piston 40 between the outer periphery of portion 38 and the inner periphery of portion 28. A packing seal 54 is positioned in a circumferential groove 56 at the inner periphery of portion 30 to provide a sliding and sealing relationship between the portions 30 and 38 and to insure chamber 52 is isolated from outside pressure influence.

It is to be noted that riser portion 38 can additionally be constructed from upper and lower elongated sections rather than the singular section shown. With such a two section riser portion 38, an upper portion of the lower section and a lower portion of the upper section would be threadably received at the inner periphery of the pistonhead 40, with the respective ends thereof either abutting or slightly spaced. If the ends of the sections are spaced within pistonhead 40 there will be no requirements for portals 46 for the passageways 48 can be aligned with such space thereby enabling the drilling fluid to flow directly therein.

A lower tensioner chamber 58, which is defined by the annular space downwardly of piston 40 between the outer periphery of portion 38 and inner periphery of portion 28, is maintained at atmospheric pressure by means of a vent hose or pipe 60 which extends downwardly from the surface and is coupled to a passageway 62 which extends through portion 32 into chamber 58. Chamber 58 is isolated from other pressure influences by means of a packing seal 63 positioned in a circumferential groove 64 at the inner periphery of portion 32. Seal 63 additionally provides a sliding and sealing relationship between portions 32 and 38.

Annular seal keeper members 66 and 68, which have an inner diameter thereof substantially equal to the outer diameter of portion 38, have a portion thereof releasably received within respective grooves 56 and 64 to retain the packing seals from any vertical displacement thereof.

Returning drilling fluid is circulated up through the wellhead 20, through the blowout preventers 23, through the connecting member 24, through the tensioner 18 where the fluid flows from portals 46 and fills the upper tensioner chamber 52, and through riser 16 wherefrom the fluid discharges into any suitable fluid reservoir carried by vessel 10. The fluid in riser 16, upwardly of tensioner 18 maintains a pressure head above the pistonhead 40 and as such, when chamber 52 is completely filled with fluid, a downwardly directed (tension force) results on a fluid effect area ($A_3$) of riser 16, such force (F) being approximated by the term $P_1 H_1 A_3$, where:

$P_1$ equals the density of the drilling fluid $H_1$ equals the length of the fluid column above head 40

$A_3$ equals the net area of the upper surface of pistonhead 40

The lower chamber 58 is maintained at atmospheric pressure, by means of the vent hose 60 which communicates between chamber 58 and the atmosphere, so that the pressure on the underside of pistonhead 40, which can be calculated as $A_3'$ times atmospheric pressure, offers negligible resistance to the downwardly directed force $P_1 H_1 A_3$. $A_3'$ equals the net area of the lower surface of pistonhead 40.

As an example of the tension force provided by a 33-inch diameter tensioner 18, 400 foot below the surface and a 20 inch outside diameter riser 16 using a drilling fluid weighing approximately 120 pounds per cubic foot, a solution of the term $P_1 H_1 A_3$ for the above figures will yield a downward force on the upper surface of pistonhead 40 of approximately 180,000 pounds. The 180,000 pound tension force as supplied by tensioner 18 is sufficient to insure that a desired net tension force will act on riser pipe 16 when all forces hereinbefore described are considered.

A primary consideration in determining the desired upper surface area of pistonhead 40 is the amount of tension force required to insure a net tension force on riser 16 under almost all conditions. Because varying sets of conditions will produce a tension force much greater than necessary it is desirable under such circumstances to provide optional control means to vary the tension force developed in tensioner 18. Such an optional control means is illustrated in FIG. 4, generally indicated at 70, and as shown comprises: a fluid tight container 72 positioned in vent hose 60 intermediate the ends thereof; a pump 74 in communication with container 72; and a pump control line 76 extending from vessel 10 to pump 74. It is to be noted that optional control means 70 can be used with other tensioner assembly embodiments described hereinafter.

In operation of control means 70, when the downward directed force on piston 40 is to be decreased for reasons mentioned hereinabove, fluid is supplied to hose 60 at the surface and flows therethrough to chamber 58. Chamber 58 completely fills with such pressure fluid and an upward force results at the lower surface of piston 40, such force acting to reduce the downward head force developed at the upper surface of piston 40. The amount of upward force on piston 40 is, for all practical purposes, dependent upon the head pressure developed by the column of fluid within hose 60 and container 72. To withdraw the pressure fluid from chamber 58 and thereby decrease the resistance to the downwardly directed force on piston 40, pump 74 is energized and fluid is withdrawn from chamber 58 into container 72 and exhausted upwardly therefrom through hose 60 if desired. Additionally the fluid withdrawn from chamber 58 can be exhausted into the water at subsea level if such an arrangement were desired. Furthermore a pump, such as pump 74 can be used to exhaust any unwanted fluid which may have leaked into the lower tensioner chamber 58.

An alternative method of supplying pressure fluid to fill chamber 58 is accomplished by a suitable valve 73, which is in communication between the inner volume of container 72 and the ambient sea water, and a valve control line 75 which extends from vessel 10 to valve 73. With such an arrangement, when fluid is to be supplied to fill chamber 58, valve 73 is opened and sea water flows through container 72, and eventually into chamber 58. The natural head pressure of the ambient sea water provides sufficient pressure to fill chamber 58.

FIG. 3 illustrates another embodiment of the present invention wherein a hydrostatic riser pipe tensioner 18' is provided with a means of replenishing packing and seal means from the vessel 10 directly to the packing areas of tensioner 18' thereby relieving any necessity for manual replacement of such packing. Inasmuch as the embodiment illustrated herein is similar to the embodiment illustrated in FIG. 2, the same reference numerals will be used for similar elements.

Hydrostatic riser pipe tensioner 18' comprises: an intermediate tubular body portion 28' having a diameter thereof larger than the diameter of riser 16; and upper and lower cylindrical end portions 30' and 32' respectively, which have an outer diameter thereof shown as approximately equal to the diameter of portion 28' and which are releasably secured to portion 28' at the respective upper and lower ends thereof. Portion 32' has a central through bore 36 therein which as shown is of a diameter equal to the diameter of riser 16 to allow riser 16 to be slidably and sealably received in tensioner 18' as hereinbefore discussed with reference to tensioner 18.

The effective length of riser 16 is adjusted to compensate for vertical displacement of vessel 10 by means of a lower portion 38 thereof being reciprocally received in the tensioner 18'. Portion 38 has an annular piston head 40' sealingly secured to the outer periphery thereof intermediate the portion thereof which reciprocates within the tensioner 18'. The outer diameter of piston 40' is substantially equal to the inner diameter of portion 28' and a sliding and sealing relationship is provided between such members by means of a replenishable packing seal 80 which is positioned in circumferential groove 44' of pistonhead 40'. Packing seal 80 is prevented from flowing freely between piston 40' and portion 28' by means of suitable retaining seals 83 and 85 which are positioned in circumferential grooves of pistonhead 40' located, respectively upwardly and downwardly adjacent groove 44'.

A tubular sleeve member 82 having a diameter thereof intermediate the diameter of body portion 28' and riser portion 38 and which extends from the upper surface of piston head 40' upwardly to an annular coupling member 84, coaxially surrounds an upper section of portion 38. The lower end of sleeve member 82 is sealingly secured to pistonhead 40' and the upper end thereof is releasably sealingly secured to a radially outwardly extending portion of coupling member 84. Coupling member 84 sealingly secures the upper end of riser portion 38 to riser pipe 16 upwardly thereof.

A packing fluid conductor, shown as pipe member 86, located intermediate the inner diameter of sleeve member 82 and the outer diameter of riser portion 38, extends axially the length of sleeve member 82, and has the lower end thereof received in a packing passageway 88 of piston head 40'. Passageway 88 extends between groove 44' and the lower end of pipe member 86. The upper end of member 86 is received in a passageway 90 of coupling member 84, which passageway 90 communicates with a flexible packing hose 92. Packing hose 92 extends downwardly from vessel 10 a length sufficient to provide for the reciprocal movement of riser pipe 16 caused by wave heaves and the like.

With such an arrangement of hose 92, passageways 90 and 88 and pipe member 86, a flowable packing material, such as a plastic packing substance or the like, is provided directly to groove 44' to replenish the packing seal 80 therein when seal 80 is dissipated because of wear due to frictional forces and the like.

Tensioner end portion 30' has a central through bore 96 therein which is of a diameter substantially equal to the outer diameter of sleeve member 82 to allow member 82, which has hereinbefore been discussed as fixedly secured to portion 38 at the upper end thereof and as such will reciprocate therewith, to be slidably received in tensioner 18.

Drilling fluid provides the necessary downwardly directed force in the same manner as hereinbefore discussed with reference to tensioner 18 and as such respective upper and lower tensioner chambers 52' and 58' require packing seals to insure isolation of such chambers from undesired pressure influences. Accordingly, a replenishable packing seal 98 is positioned in a circumferential groove 56' at the inner periphery of portion 30' to provide a sliding and sealing relationship between the portion 30' and sleeve member 82; and a replenishable packing seal 100 is positioned in a circumferential groove 64' at the inner periphery of portion 32' to provide a sliding and sealing relationship between portions 32' and 38. A packing hose 102, which is in communication with groove 56' through a packing passageway 104 in portion 30', extends downwardly from vessel 10. An additional packing hose 106 is in communication with groove 64' by means of packing passageway 108 in end portion 32'. With such an arrangement of hoses 102 and 106 and passageways 104 and 108, a flowable packing material, such as a plastic packing substance or the like, is provided directly to grooves 56' and 64' to replenish the respective packing seals 98 and 100 therein when such seals are dissipated because of wear due to frictional forces and the like.

The structure and operation of other members shown in FIG. 3 and not hereinabove described are similar to the like numbers shown and hereinbefore described with reference to the embodiment of FIG. 2.

FIG. 5 illustrates still another embodiment of the present invention wherein a hydrostatic riser pipe tensioner 18'' makes use of the waterhead thereabove to obtain a net tension effect on riser 16. Inasmuch as the embodiment herein is similar to the embodiment illustrated in FIG. 2, the same reference numerals will be used for like elements and the same reference numerals doubly primed will be used for similar elements.

The description of elements set forth heretofore with reference to tensioner 18 is herein adopted for a description of such like and similar elements of tensioner 18'' except with the primary difference being that unlike tensioner 18, which relies on the drilling fluid head upwardly of pistonhead 40 to maintain a tensile force on riser 16, tensioner 18'' makes use of the waterhead upwardly of pistonhead 40' to maintain such net tensile force. Accordingly tensioner 18'' has no passageways communicating between the inner periphery of riser portion 38 and the upper tensioner chamber 52'' but rather has a plurality of axially extending bores 110 which are circumferentially spaced about upper end portion 30'' and extend through such portion 30''. Bores 110 open chamber 52'' to the ambient water upwardly thereof and as such chamber 52'' completely fills with water and a downwardly directed (tension force) results on a fluid effect area ($A_3''$) of riser 16, such force ($F''$) being approximated by the terms $P_1''$ $H_1''$ $A_3''$, where:

$P_1''$ equals the density of the ambient water
$H_1''$ equals the depth of head 40'' below the water surface
$A_3''$ equals the net area of the upper surface of pistonhead 40''.

The lower chamber 58 is constantly maintained at atmospheric pressure or is made variable in a manner described heretofore with reference to tensioner assembly 18.

It is to be noted that inasmuch as the density of water is generally less than the density of drilling fluid, the upper surface area of pistonhead 40'' must be proportionally larger than the upper surface area of pistonhead 40 to obtain the same tensile force for a given set of circumstances. Inasmuch as the diameter of pistonhead 40'' will generally be larger than the diameter of pistonhead 40, so must the diameters of body portion 28'' and end portions 30'' and 32'' be larger than the respective elements thereof of tensioner assembly 18. It is to be additionally noted that although tensioner 18'' is described hereinabove with reference to tensioner 18, such tensioner 18'' can also be patterned after tensioner 18' by making modifications similar to those described with reference to tensioner 18'.

It is to be additionally noted that riser portion 38'' is constructed from upper and lower elongated sections rather than the singular section shown heretofore with reference to tensioner assemblies 18 and 18'. With such a two section riser portion 38'', an upper portion of the lower section and a lower portion of the upper section are threadably received at the inner periphery of pistonhead 40" with the respective ends of such sections spaced from one another. As heretofore noted, a riser portion such as portion 38" can be used with tensioner assemblies 18 and 18' rather than the portion 38 described for use therewith.

Although the description hereinabove was referenced for use of a tensioner assembly of this invention in an underwater drilling operation, such tensioner assembly can be used in other underwater operations where it is desirous to maintain a net tensile force in a long string of submerged pipe. Accordingly, the term riser pipe as used herein is not restricted to drilling use but rather can be used to described an upper reciprocating pipe of other underwater apparatus, for example, if an upper pipe of a production and storage system for offshore oil wells of a type illustrated in U.S. Pat. No. 3,472,032 were to be axially reciprocal, a tensioner assembly of this invention could be used therewith.

By following the principles taught by this invention one skilled in the art can achieve the hereinabove mentioned results with structural alterations to the preferred embodiments set forth hereinbefore, for example: elements herein described as releasably secured can often be fixedly secured without adverse effect on the results obtained by the preferred embodiment; a pump can be positioned at vessel 10 for attachment to vent hose 60 when it is desired to have pressure other than atmospheric pressure within lower tensioner chamber 58; the drilling can be done from a fixed platform rather than a floating vessel 10 as illustrated and in such case the stroke of the tensioner assembly need only be of sufficient length to compensate for ground shifts, strong currents, temperature variations and the like; and inasmuch as tensioner assembly 18" is open to ambient water upwardly thereof, seal 54 can be dispensed with if so desired. Accordingly, the description herein does not limit the structure and method of this invention and the invention is defined by the scope of the claims set forth hereinafter.

What is claimed is:

1. A tensioning assembly for a riser pipe being used in a body of water, comprising: an elongated body portion which receives therein a randomly axially reciprocating lower portion of such a riser pipe, said body portion surrounding and extending radially of said lower portion and defining an annular sealed chamber in conjunction with said lower portion in all relative axial positions therebetween; annular piston means carried by said lower portion intermediate the axial ends thereof and axially movable therewith and axially slidably received in said chamber in response to said axial movement of said lower portion to define upper and lower sealed chamber sections; at least one passageway in one of said portions which said passageway communicates between a hydraulic fluid pressure source and said upper sealed chamber section; and fluid conducting means communicating with said lower sealed chamber section and an external gaseous fluid pressure source.

2. A tensioning assembly as specified in claim 1 wherein said fluid conducting means selectively communicate between said external gaseous fluid pressure source and an external hydraulic fluid pressure source.

3. A tensioning assembly as specified in claim 1 wherein said hydraulic fluid pressure source is located internally of said lower portion.

4. A tensioning assembly as specified in claim 1 wherein said hydraulic fluid pressure source is the body of water within which the tensioning assembly is located.

5. A tensioning assembly as specified in claim 1 wherein said external gaseous fluid pressure source is the atmosphere.

6. A tensioning assembly as specified in claim 1 additionally comprising: a sealed container disposed in said fluid conducting means externally of said lower sealed chamber section, said container having a volumetric capacity thereof at least substantially equal to the volumetric capacity of said lower sealed chamber section; and double-action pump means disposed in said fluid conducting means intermediate said sealed container and said lower sealed chamber section.

7. A tensioning assembly as specified in claim 1 additionally comprising selectively operable exhaust pump means communicating with said lower sealed chamber section.

8. A tensioning assembly as specified in claim 1 additionally comprising: at least one passageway communicating between the internal periphery of said body member and another fluid conducting means, and said another fluid conducting means being in communication with an external sealant source.

9. A tensioning assembly as specified in claim 8 wherein said sealant source is located upwardly of the surface of said body of water.

10. A method of maintaining tension in a submerged axially reciprocating elongated underwater riser pipe comprising the steps of: maintaining a downward force on a lower submerged area of said riser pipe by having a hydrostatic head of hydraulic fluid upwardly of said area be hydraulically effective on said area; and maintaining the pressure in an externally supplied gaseous fluid communicating with another lower submerged area of said riser pipe to produce an upward force in said riser pipe which is always less than said downward force.

11. A method as specified in claim 10 wherein said first identified submerged area is sealingly isolated from pressure influences other than said hydraulic pressure fluid.

12. A method as specified in claim 11 wherein said another submerged area is sealingly isolated from pressure influences other than said externally supplied gaseous fluid.

13. A method as specified in claim 12, including the additional step of providing a continuous supply of flowable sealant from an external sealant source to seal said submerged areas from said other pressure influences.

14. A method as specified in claim 12 wherein said pressure in said externally supplied gaseous fluid is substantially the pressure of atmosphere.

15. A method of maintaining tension in a submerged axially reciprocating elongated underwater riser pipe comprising the steps of: maintaining a downward force on a lower submerged area of said riser pipe by having a hydrostatic head of hydraulic fluid upwardly of said area be hydraulically effective on said area; and selectively maintaining the pressure in an externally supplied fluid communicating with another lower submerged area of said riser pipe to produce an upward force in said riser pipe which is always less than said downward force.

16. A method as specified in claim 15 wherein said first identified submerged area is sealingly isolated from pressure influences other than said hydraulic pressure fluid.

17. A method as specified as claim 16 wherein said another submerged area is sealingly isolated from pressure influences other than said externally supplied fluid.

18. A method as specified in claim 17, including the additional step of providing a continuous supply of flowable sealant from an external sealant source to seal said submerged areas from said another pressure influences.

19. A method as specified in claim 17 wherein said maintaining is selectively between a hydraulic fluid and a gaseous fluid.

20. A method as specified in claim 17 wherein said externally supplied fluid is a hydraulic fluid.

21. A method as specified in claim 17 wherein said selective maintaining is selectively between a hydraulic fluid and a gaseous fluid.

* * * * *